United States Patent
Toda et al.

[11] Patent Number: 5,743,598
[45] Date of Patent: Apr. 28, 1998

[54] ANTI-SKID CONTROL APPARATUS

[75] Inventors: Hiroshi Toda; Masaru Kamikado; Satoshi Yokoyama; Masahiko Sakabe, all of Aichi, Japan

[73] Assignee: Aisin Seiki Kabushiki Kaisha, Kariya, Japan

[21] Appl. No.: 667,732

[22] Filed: Jun. 21, 1996

[30] Foreign Application Priority Data

Jun. 22, 1995 [JP] Japan .................... 7-156328

[51] Int. Cl.$^6$ .................. B60T 8/88; B60T 13/18
[52] U.S. Cl. .................. 303/11; 303/116.4; 303/122.12; 303/122.13; 303/DIG. 4
[58] Field of Search .................. 303/10–11, 116.1–116.4, 303/DIG. 3, DIG. 4, 122.12, 122.13, 122.05, 900, 901

[56] References Cited

U.S. PATENT DOCUMENTS

| | | | |
|---|---|---|---|
| 4,421,361 | 12/1983 | Arikawa et al. | 303/122.12 |
| 4,778,226 | 10/1988 | Brown | 303/10 |
| 5,197,787 | 3/1993 | Matsuda et al. | 303/116.4 |
| 5,290,098 | 3/1994 | Burgdorf et al. | 303/901 |
| 5,295,737 | 3/1994 | Eppie et al. | 303/11 |
| 5,364,173 | 11/1994 | Wada et al. | 303/11 |
| 5,413,404 | 5/1995 | Inagawa | 303/122.12 |
| 5,445,441 | 8/1995 | Inagawa et al. | 303/10 |
| 5,454,632 | 10/1995 | Burgdorf et al. | 303/11 |
| 5,487,593 | 1/1996 | Potts et al. | 303/11 |
| 5,492,395 | 2/1996 | Naruse et al. | 303/122.12 |
| 5,558,414 | 9/1996 | Kubota | 303/122.12 |

FOREIGN PATENT DOCUMENTS 62-134361  6/1987  Japan .

Primary Examiner—Douglas C. Butler
Attorney, Agent, or Firm—Sughrue, Mion, Zinn, Macpeak & Seas, PLLC

[57] ABSTRACT

A pressure control apparatus is operated to connect a wheel cylinder to a reservoir via a return fluid passage so that brake fluid will be stored in the reservoir to reduce the pressure. In accordance with the operation of a fluid pressure pump, the brake fluid is discharged from the reservoir into the return fluid passage to supply the brake fluid to the wheel cylinder, so that the wheel cylinder pressure is gradually increased. Based on detection of a sharp decrease of the motor load, it is estimated that the reservoir has become empty. Then, brake fluid is taken from a fluid pressure generating apparatus into the wheel cylinder.

4 Claims, 10 Drawing Sheets

ANTI-SKID CONTROL APPARATUS

BACKGROUND OF THE INVENTION

The present invention relates to an anti-skid control apparatus for controlling the braking force applied to road wheels of a vehicle during braking operation to prevent the wheels from locking and, more particularly, to an anti-skid control apparatus which has a reservoir and a fluid pressure pump provided in a return fluid passage for bypassing a fluid pressure control apparatus, and wherein a pressure in a wheel brake cylinder is decreased by discharging the brake fluid therein into the reservoir, and the pressure is gradually increased by the pressure pump which returns the brake fluid into the wheel brake cylinder.

Japanese patent application Laid-Open No. SHO 62-134361 discloses a conventional anti-skid control apparatus in which a pressure in a wheel brake cylinder is decreased by discharging the brake fluid therein into a reservoir, and the brake fluid stored in the reservoir is returned to the wheel brake cylinder by a fluid pressure pump. This apparatus comprises return conduits connected to the brake fluid circuit between the brake pressure adjust valves and the wheel cylinders, so as to reduce the impact on the brake pedal.

In an anti-skid control apparatus wherein the fluid pressure control apparatus reduces the brake fluid pressure in the wheel cylinder, disconnects the communication between the wheel cylinder and the fluid pressure generator, and supplies brake fluid to the wheel cylinder in accordance with operation of the fluid pressure pump to gradually increase the wheel cylinder pressure, the apparatus needs to supply brake fluid to the wheel cylinder from the reservoir. If the reservoir becomes empty, the brake fluid supply to the wheel cylinder would discontinue, resulting in insufficient deceleration of the vehicle. Thus, the amount of brake fluid present in the reservoir needs a to be monitored. However, employment of a sensor specifically for detecting the amount of brake fluid in the reservoir would be undesirable considering the demand for cost reduction.

SUMMARY OF THE INVENTION

It is an object of the present invention to estimate the amount of brake fluid stored in the reservoir by a low-cost method and in addition, achieve a sufficient deceleration even if it is determined that the reservoir has become empty, using an anti-skid control apparatus in which the reservoir stores the brake fluid from the wheel cylinder and the pump returns the brake fluid from the reservoir to the wheel cylinder to gradually increase the pressure.

To achieve the above-stated object, according to the present invention, there is provided an anti-skid control apparatus, as schematically illustrated in FIG. 1, comprising: a wheel brake cylinder WC for applying a braking force to a wheel WL of a vehicle; a fluid pressure generating apparatus PG for supplying brake fluid under pressure to the wheel brake cylinder WC; a fluid pressure control apparatus FV provided between the fluid pressure generating apparatus PG and the wheel brake cylinder WC for controlling fluid pressure in the wheel brake cylinder WC; a reservoir RT communicated with the fluid pressure control apparatus FV, the reservoir having a capacity for storing a predetermined amount of brake fluid and the reservoir storing the brake fluid from the wheel brake cylinder through the fluid pressure control apparatus to decrease the pressure in the wheel brake cylinder, a return passage RP for communicating the reservoir with the wheel brake cylinder; a pressure pump FP disposed in the return passage, the pressure pump having an inlet port communicated with the reservoir and an outlet port communicated with the wheel brake cylinder for discharging a pressurized brake fluid thereto and the pressure control apparatus disposed in communication with the fluid pressure generating apparatus and the wheel brake cylinder enables the pressure pump discharging the brake fluid stored in the reservoir into the return passage to gradually increase the pressure in the wheel brake cylinder; an electric motor for driving the pump; motor load detecting means DL for detecting motor load on the electric motor; and reservoir emptiness detecting means RE for determining that no brake fluid remains in the reservoir when the motor load detected by the motor load detecting means sharply decreases during the operation of gradually increasing the pressure in the wheel brake cylinder.

According to a second embodiment of the present invention based on the above-described embodiment, the motor load detecting means DL includes means DI for detecting current through the motor.

According to a third embodiment of the invention, the motor load detecting means DL includes means DV for detecting regenerative voltage that occurs when duty voltage for driving the motor is off.

According to the third embodiment of the invention, the anti-skid control apparatus further comprises pressure increase allowing means AP for, when the reservoir emptiness estimating means RE estimates that no brake fluid is stored in the reservoir RT, driving the fluid pressure control apparatus FV to allow for fluid communication of the fluid pressure generating apparatus PG with the wheel cylinder WC.

With the above-described construction of the invention, when the fluid pressure generating apparatus PG is driven, the brake fluid is supplied to the wheel cylinder WC through the fluid pressure control apparatus FV so that a braking force is applied to the wheel WL. The fluid pressure control apparatus FV is then driven to disconnect the communication between the wheel cylinder WC and the fluid pressure generating apparatus PG and store the brake fluid from the wheel cylinder VC in the reservoir RT. The fluid pressure generating apparatus PG then disconnects the communication between the wheel cylinder WC and the reservoir RT. Then, the fluid pressure pump FP operates to discharge the brake fluid from the reservoir RT into the return fluid passage RP so that the pressure in the wheel cylinder WC will gradually increase. As described above, when the reservoir RT stores the brake fluid from the wheel cylinder WC, the pressure inside the wheel cylinder WC decreases.

If the detection of the motor load detecting means DL indicates a sharp decrease of the load of the electric motor that drives the fluid pressure pump FP during the operation of increasing the fluid pressure on the wheel cylinder WC, the reservoir emptiness estimating means RE enables estimation that the reservoir RT has become empty.

In the second embodiment described above, it can be estimated that the reservoir RT has become empty during the operation of increasing the fluid pressure on the wheel cylinder WC, on the basis of a sharp decrease of the current through the electric motor driving the fluid pressure pump FP which is detected by the motor current detecting means DI.

In the third embodiment described above, it can be estimated that the reservoir RT has become empty during the operation of increasing the fluid pressure on the wheel cylinder WC, on the basis of a sharp increase of the voltage across the electric motor driving the hydraulic pressure pump which is detected by the means DV for detecting regenerative voltage that occurs when the duty voltage of the electric motor is off.

In the fourth embodiment described above, if the reservoir RT becomes empty during the operation of gradually increasing the pressure inside the wheel cylinder WC, the fluid pressure control apparatus FV is driven to achieve fluid communication between the fluid pressure generating apparatus PG and the wheel cylinder WC to allow for supply of the brake fluid to the wheel cylinder WC. Thus, sufficient deceleration will be achieved during the operation of gradually increasing the pressure.

The above and other objects, features and advantages of the present invention will be more apparent and more readily appreciated from the following detailed description of preferred exemplary embodiment of the present invention, taken in connection with the accompanying drawings.

DETAILED DESCRIPTION OF THE INVENTION

Preferred embodiments of the present invention will be described hereinafter with reference to the accompanying drawings.

Figure 1:
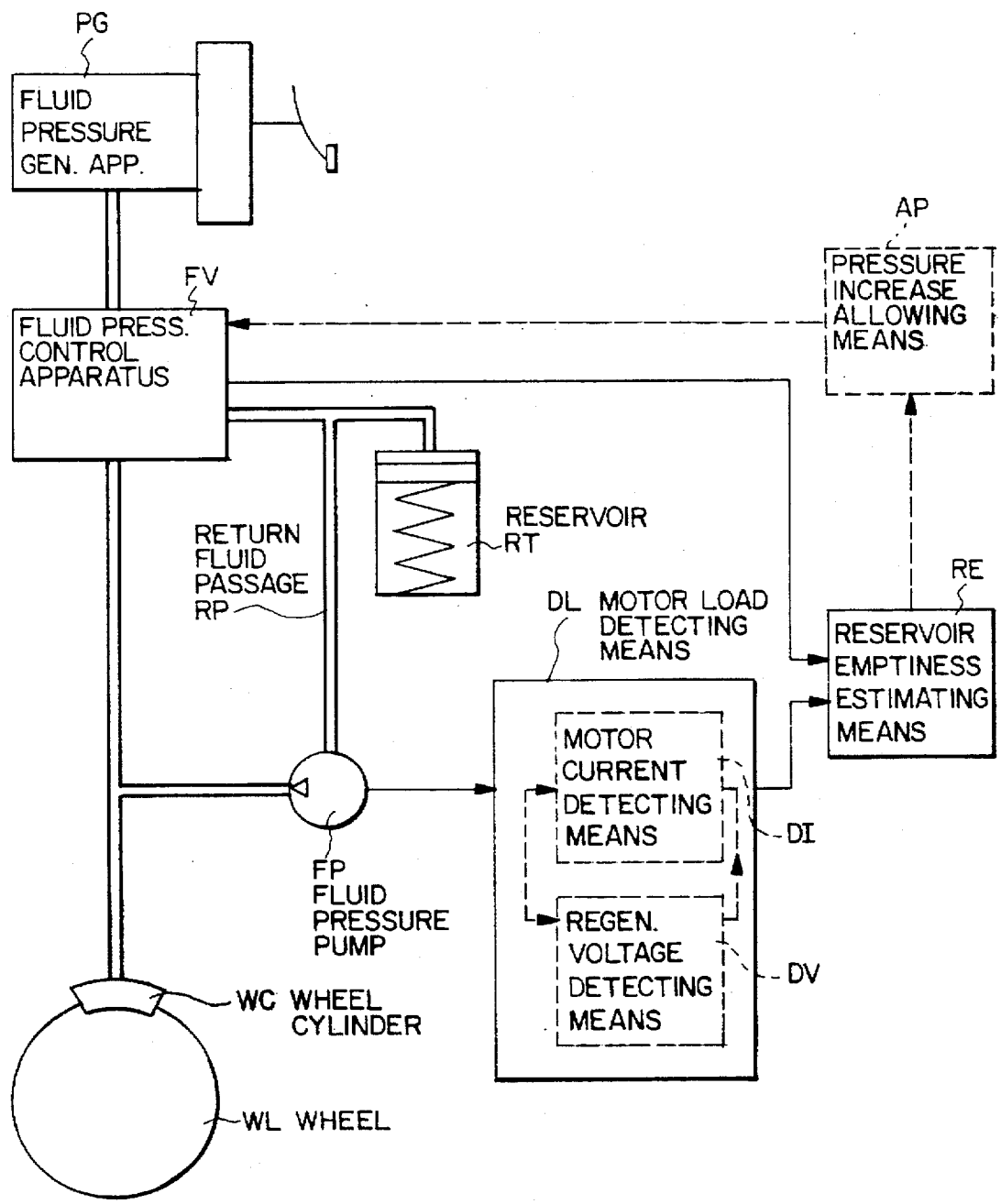
FIG. 1 is a schematic block diagram of the anti-skid control apparatus of the present invention.
Figure 2:
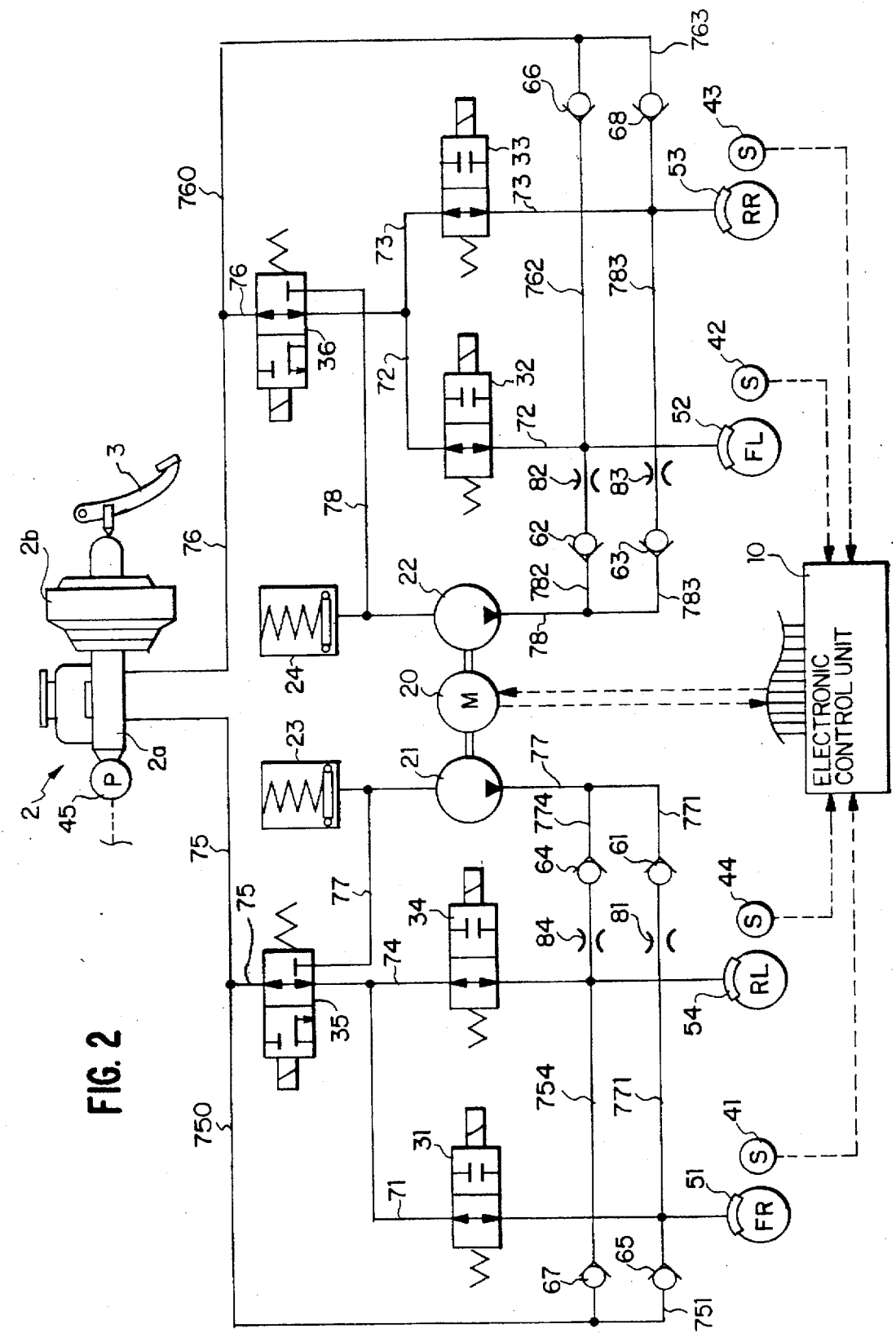
FIG. 2 illustrates the overall construction of the anti-skid control apparatus for a four-wheel drive vehicle according to the invention.

Referring to FIG. 2, according to an embodiment of the anti-skid control apparatus of the invention, a fluid pressure generating apparatus 2 comprises a master cylinder 2a, a booster 2b and a brake pedal 3. Two-port, two-position valves (electromagnetic valves) 31–34 are provided in fluid passages 71–74 connecting to wheel cylinders 51–54 disposed in a front right wheel FR, a front left wheel FL, a rear right wheel RR and a rear left wheel RL, respectively. Three-port two-position valves 35, 36 are provided in fluid passages 75, 76 connecting the fluid passages 71, 74 and the fluid passages 72, 73, respectively, to the master cylinder 2a. This embodiment employs a diagonal circuit (X-type circuit) layout as indicated in FIG. 2.

One of the ports of the electromagnetic valve 35 disposed in the FR-RL wheel circuit is connected to the fluid passage 71 between the electromagnetic valve 31 and the wheel cylinder 51 through return fluid passages 77, 771, and also connected to the fluid passage 74 between electromagnetic valve 34 and the wheel cylinder 54 through return fluid passages 77, 774. A return pump 21 is provided in the fluid passage 77 and connected at its input side to a reservoir 23. The fluid passages 771, 774 are provided with check valves 61, 64 that prevent brake fluid from flowing toward the pump 21. The fluid passages 771, 774 are also provided with orifices 81, 84 disposed between the check valves 61, 64 and the wheel cylinders 51, 54. The fluid passage between the master cylinder 2a and the electromagnetic valve 35 is connected to the fluid passages between the electromagnetic valves 31, 34 and the wheel cylinders 51, 54 through a fluid passage 750 and fluid passages 751, 754. The fluid passages 751, 754 are provided with check valves 65, 67 to prevent the brake fluid from flowing toward the wheel cylinders 51, 54.

The FL-RR wheel circuit is similarly constructed. One of the ports of the electromagnetic valve 36 disposed in this circuit is connected to the fluid passage 72 between the electromagnetic valve 32 and the wheel cylinder 52 through return fluid passages 78, 782 and also connected to the fluid passage 73 between electromagnetic valve 33 and the wheel cylinder 53 through return fluid passages 78, 783. A return pump 22 is provided in the fluid passage 78 and connected at its input side to a reservoir 24. The fluid passages 782, 783 are provided with check valves 62, 63 that prevent brake fluid from flowing toward the pump 22. The fluid passages 782, 783 are also provided with orifices 82, 83 disposed between the check valves 62, 63 and the wheel cylinders 52, 53. The fluid passage between the master cylinder 2a and the electromagnetic valve 36 is connected to the fluid passages between the electromagnetic valves 32, 33 and the wheel cylinders 52, 53 through a fluid passage 760 and fluid passages 762, 763. The fluid passages 762, 763 are provided with check valves 66, 68 to prevent the brake fluid from flowing toward the wheel cylinders 52, 53.

The pumps 21, 22 are continuously driven by an electric motor 20 during anti-skid control so that an amount of the brake fluid, in accordance with the operating speed of the electric motor 20, is supplied to each of the wheel cylinders 51–54 through the return fluid passages 77, 771, 774 and the return fluid passages 78, 782, 783. The reservoirs 23, 24 have pistons and springs for storing the brake fluid flowing from the electromagnetic valves 35, 36 through the return fluid passages 77, 78. The brake fluid drawn out from the reservoirs 23, 24 by the pumps 21, 22 is supplied to the wheel cylinders 51–54 when the electromagnetic valves 31–34 are closed (on) and is returned to the reservoirs 23, 24 when the electromagnetic valves 31–34 are open (off). The brake fluid flow discharged from the pump 21 is divided into the wheel cylinders 51, 54 by the check valve 61 and the orifice 81, the check valve 64 and the orifice 84. Similarly, the brake fluid flow discharged from the pump 22 is divided into the wheel cylinders 52, 53 by the check valve 62 and the orifice 82, the check valve 63 and the orifice 83.

The electromagnetic valves 31–34 take a first position as indicated in FIG. 2 when the solenoids are not energized (off), so as to connect the wheel cylinders 51–54 to the fluid pressure control apparatus 2 through the electromagnetic valves 35, 36 taking the first position. The electromagnetic valves 31–34 take the second position when the solenoids are energized (on), so as to disconnect the wheel cylinders 51–54 from the fluid pressure control apparatus 2. When the electromagnetic valves 35, 36 are off, the electromagnetic valves 35, 36 take the first position as indicated in FIG. 2 so as to connect the electromagnetic valves 31–34 to the fluid pressure control apparatus 2 and disconnect the return fluid passages 77, 78 from the fluid pressure control apparatus 2. When the electromagnetic valves 35, 36 are on, they take the second position to disconnect the electromagnetic valves 31–34 from the fluid pressure control apparatus 2 and connect them to the reservoirs 23, 24 and the pumps 21, 22. The check valves 65–68 allows the flux from the wheel cylinders 51–54 toward the fluid pressure control apparatus 2 and inhibits flow in the opposite direction.

During the anti-skid control during which the pumps 21, 22 are continuously driven, the fluid pressures on the wheel cylinders 51–54 can be rapidly increased, gradually increased or normally decreased, selectively by controlling the energization of the electromagnetic valves 31–36. When all the electromagnetic valves 31–36 are off, the brake fluid is directly supplied to the wheel cylinders 51–54 to rapidly increase the pressure. When the electromagnetic valves 35, 36 are on and the electromagnetic valves 31–34 are off, the wheel cylinders 51–54 are connected to the reservoirs 23, 24 so that the pressure decreases. When all the electromagnetic valves 31–36 are on, the brake fluid flow discharged from the reservoirs 23, 24 by the pumps 21, 22 are led to the wheel cylinders 51–54 through the check valves 61–64 and the orifices 81–84. Since the flow rate of the brake fluid from the pumps 21, 22 to the wheel cylinders is limited to a considerably small value, the fluid pressure in the wheel cylinders 51–54 gradually increases.

The fluid pressure in the wheel cylinders 51–54 can be maintained at a substantially constant level by adjusting the time intervals of turning on and off the electromagnetic valves 31–34 while the electromagnetic valves 35, 36 are continuously on. The pressure in the wheel cylinders 51–54 can also be maintained by turning off the electric motor 20 while the electromagnetic valves 31–34 are continuously on. However, since this pressure maintaining method will result in frequent control operations of the electric motor 20, this method is not employed for the pressure maintaining mode according to this embodiment.

The electromagnetic valves 31–36 are connected to and controlled by an electronic control unit 10. The electric motor 20 is also connected to and controlled by the electronic control unit 10. The electronic control unit 10 receives a monitor voltage for detecting the voltage (regenerative voltage) occurring when the duty voltage for driving the electric motor 20 is off, or the current through the electric motor 20. The electronic control unit 10 also receives signals from the wheel speed sensors 41–44 disposed in the wheels FR, FL, RR, RL for detecting the respective wheel speeds. Each wheel speed sensor comprises a toothed rotor that is rotated by rotation of the corresponding wheel and an electromagnetic induction-type sensor disposed facing the teeth of the rotor, and thus outputs a voltage of a frequency in accordance with the rotational speed of the wheel. The electronic control unit 10 further receives a signal from a pressure sensor 45 for detecting the output pressure of the master cylinder 2a.

Figure 3:
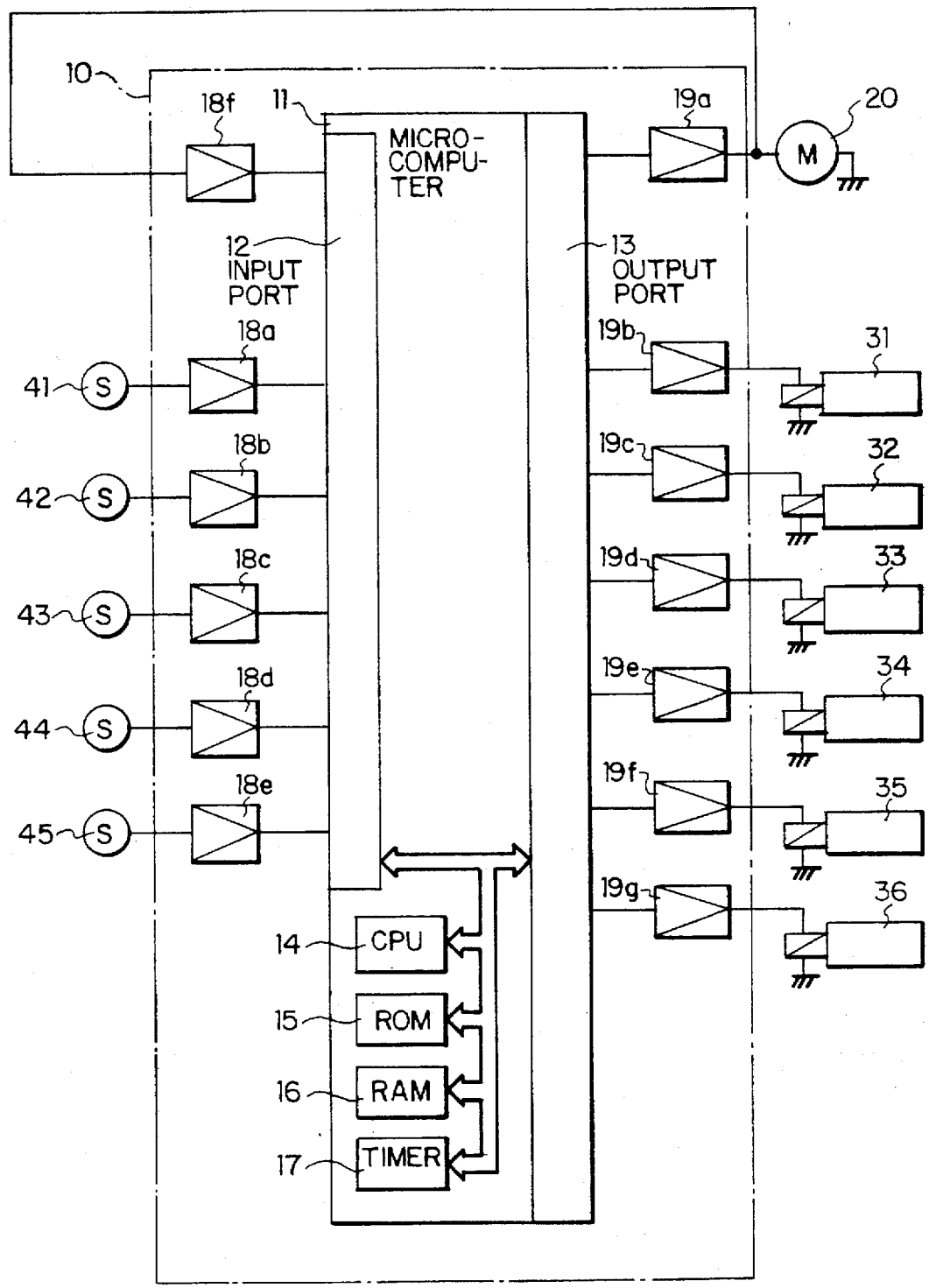
FIG. 3 is a block diagram of the electronic control unit shown in FIG. 2.

The electronic control unit 10 has a microcomputer 11 comprising a CPU 14, a ROM 15, a RAM 16, a timer 17, an input port 12 and an output port 13, as shown in FIG. 3. The signals from the wheel speed sensors 41–44 and the pressure sensor 45 are inputted to the CPU 14 through amplifiers 18a–18e and the input port 12. The monitor voltage for detecting the voltage (regenerative voltage) occurring when the duty voltage for driving the electric motor 20 is off, or the current through the electric motor 20 is inputted to the CPU 14 through an A-D converter 18f and the input port 12. The electronic control unit 10 outputs a control signal to the electric motor 20 through the output port 13 and a drive circuit 19a. In addition, the electronic control unit 10 outputs control signals to the electromagnetic valves 31–36 through the output port 13 and drive circuits 19b–19g. The ROM 15 of the microcomputer 11 stores the program for the anti-skid control. The CPU 14 executes the program when the ignition switch (not shown) is turned on. The RAM 16 temporarily stores variable data needed for execution of the programs.

This embodiment executes the program when the ignition switch is turned on. The program is executed to perform the operation as illustrated in FIG. 4.

Figure 4:
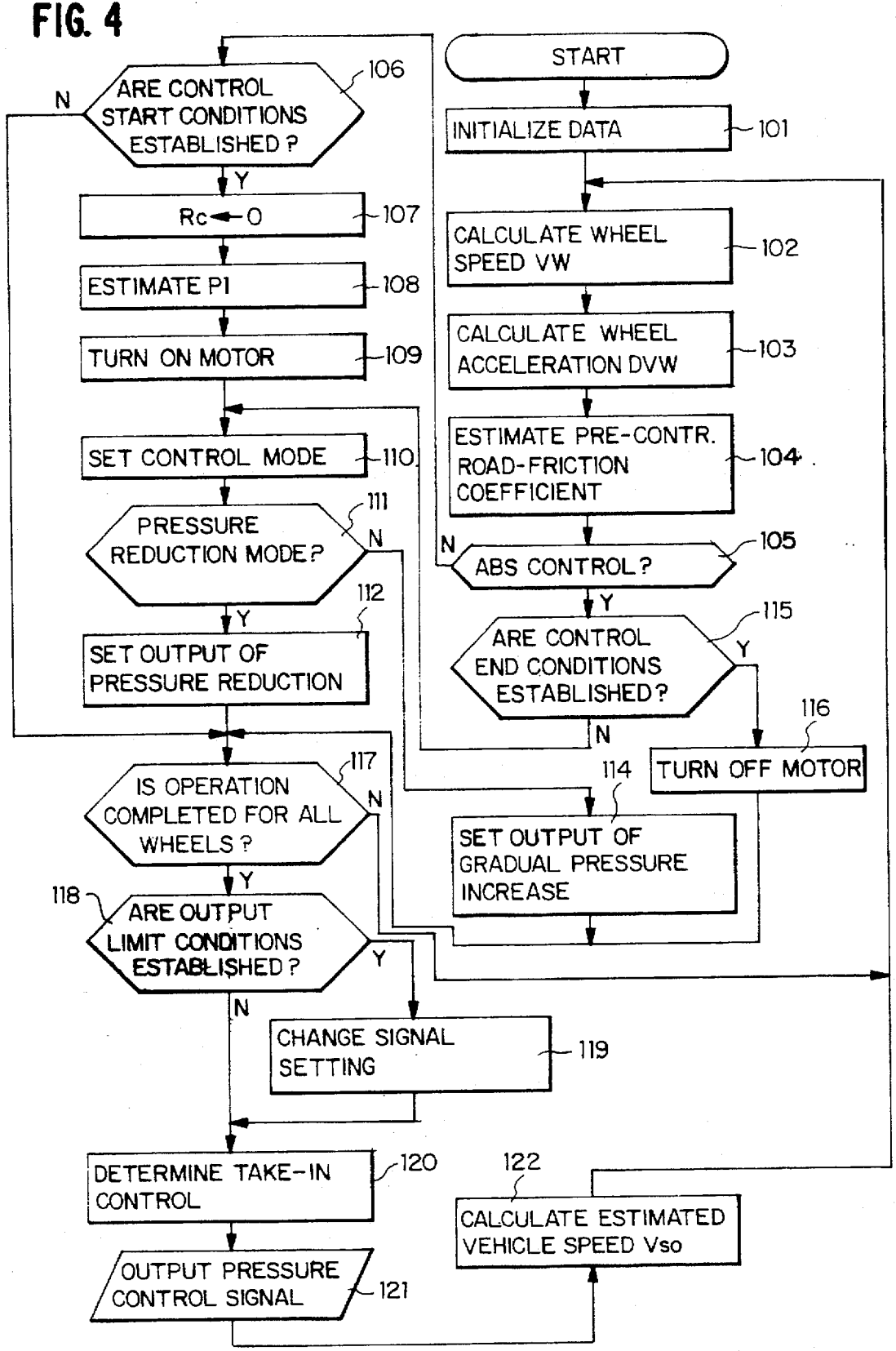
FIG. 4 is a flowchart illustrating an overall operation of anti-skid control according to an embodiment of the invention.

Referring to the flowchart of FIG. 4, step 101 initializes the microcomputer 11 to clear various calculated values, such as an estimated vehicle speed V20 used as the control criterion vehicle speed, wheel speeds VW, wheel accelerations DVW, etc. Step 102 calculates wheel speeds VW based on the signals from the wheel speed sensors 41–44. Step 103 calculates wheel accelerations DVW based on the calculated wheel speeds VW. Step 104 estimates a road friction coefficient to set the present road friction coefficient to a high μ or a low μ.

Subsequently, step 105 determines whether the anti-skid control is being performed with respect to each wheel. If the anti-skid control is being performed, the operation proceeds to step 115. If the anti-skid control is not performed (a pre-control period), the operation proceeds to step 106 to determine whether the anti-skid control starting conditions have been established with respect to each wheel. If the conditions have not been established with respect to the wheel concerned, the operation jumps to step 117. If the starting conditions have been established, the operation proceeds to step 107 where the fluid amount Rc in the reservoir 23 is cleared. Then step 108 estimates a wheel cylinder pressure P1 of the control object (for example, expressed as Pfrl for the wheel FR) based on the vehicle deceleration determined by differentiating the estimated vehicle speed. When the brake fluid pressure control is just started, the fluid amounts in the reservoirs 23, 24 are zero. Since the vehicle deceleration Gso is inversely proportional to the wheel cylinder pressure P1, the wheel cylinder pressure P1 can be determined on the basis of the vehicle deceleration Gso.

The operation then proceeds to step 109 to turn on the electric motor 20 to start driving the pumps 21, 22. The electric motor 20 is driven under the duty control in which on-off cycles are repeated until the end of this anti-skid control. Although the electric motor 20 is also driven during the pressure reduction mode according to this embodiment, the electric motor 20 may be driven only during the gradual pressure increase mode. Then, step 110 selects the pressure reduction mode or the gradual pressure increase mode depending on the braking condition and the road friction coefficient. Although the friction coefficient is determined to the high μ or the low μ in step 104 before the control starts, the friction coefficient is determined to a high μ, an intermediate μ or a low μ in accordance with the slip rate after the control has started.

Step 111 determines whether the control mode is the pressure reduction mode. If it is the pressure reduction mode, the operation proceeds to step 112 to set a pressure reduction signal. If it is not the pressure reduction mode, it is determined that the control mode is the gradual pressure increase mode and the operation proceeds to step 114 to set a gradual pressure increase signal.

Step 115, which is performed if step 105 determines that the anti-skid control is being performed, determines whether the anti-skid control ending conditions have been established. If the conditions have not been established, the operation proceeds to step 110 to set the control mode. If step 115 determines that the ending conditions have been established, the operation proceeds to step 116 where the electric motor 20 is turned off after a predetermined delay time, thus stopping the operation of the pumps 21, 22.

The above described setting of control mode and output of pressure reduction or gradual pressure increase signal are performed with respect to each wheel in substantially the same manner. Step 117 determines whether the above described operation has been performed for all the wheels. If the operation has not been performed for all the wheels, the operation starting from step 102 will be repeated. Step 118 determines whether the output limiting conditions have been established. If the conditions have not been established, the operation proceeds to step 120 for take-in control determination. If the limiting conditions have been established, the operation proceeds to step 119 and then to step 120. According to this embodiment, it is possible to bring a wheel of the FR-RL circuit or the FL-RR circuit under the gradual pressure increase mode while the other wheel of the FR-RL circuit or the FL-RR circuit is under the pressure reduction control. However, while a wheel cylinder is under the pressure reduction control, it is impossible to achieve the rapid pressure increase mode by connecting the master cylinder 2a to the wheel cylinders 51, 54 (52, 53). Therefore, if a wheel cylinder is under the pressure reduction mode and the second one is not under either the pressure control mode or the gradual pressure increase mode, step 119 changes the signal setting for that second wheel cylinder to the gradual pressure increase signal. Then, step 120 performs the take-in control determination as described later.

Step 121 outputs a fluid pressure control signal to perform the brake fluid pressure control. More specifically, if the pressure reduction signal is outputted, the electromagnetic valve for the control object, for example, the electromagnetic valve 31 for the wheel FR, is turned on so that the brake fluid is stored in the reservoir 23 to decrease the pressure. If the gradual pressure increase signal is outputted, the electromagnetic valves 31, 35 for the wheel FR (an example of the control object) are turned on so that the brake fluid drawn out from the reservoir 23 by the pump 21 is supplied to the wheel cylinder 51 through the check valve 61 and the orifice 81 to gradually increase the pressure. When the take-in control is performed, the electromagnetic valves 35, 31 of the wheel FR are turned off so that the brake fluid is supplied from the master cylinder 2a to the wheel cylinder 51. During the normal brake operation when no pressure control signal is outputted, the electromagnetic valves 35, 31 for the wheel FR are off so that the brake pressure is supplied directly from the master cylinder 2a to the wheel cylinder 51. After step 121, step 122 calculates an estimated vehicle speed Vso used as a criterion for the anti-skid control. Step 122 is followed by step 102 to repeat the operation.

Figure 5:
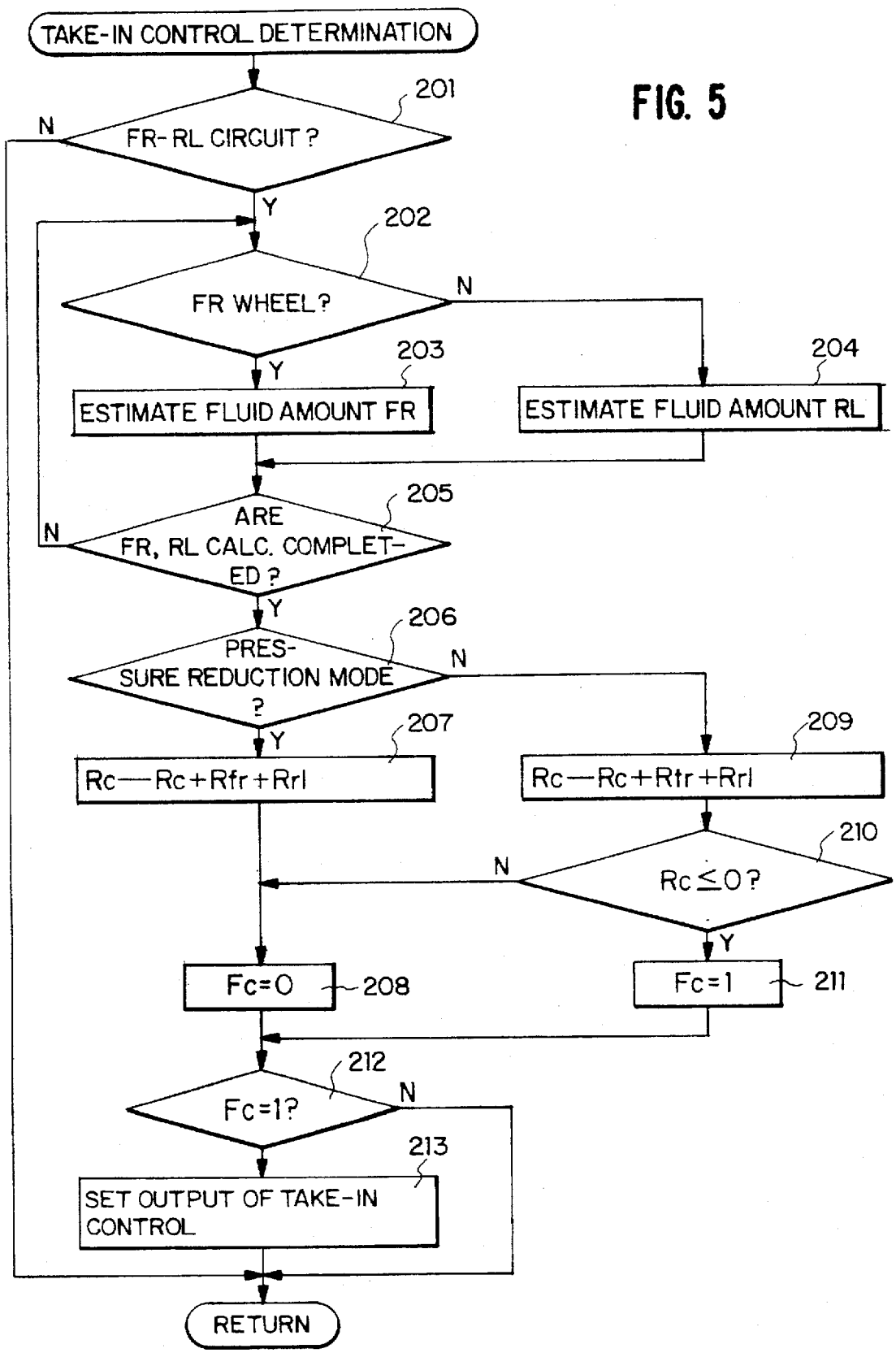
FIG. 5 is a flowchart illustrating an operation of take-in determination according to an embodiment of the invention.

The flowchart of FIG. 5 illustrates the operation of take-in determination in step 120 shown in FIG. 4, in conjunction with the brake circuit for the wheels FR and RL illustrated in a left half of the diagram of FIG. 2. When this control is started, step 201 checks whether the wheel FR or RL line is a control object. If neither of them is a control object, the operation returns to the routine shown in FIG. 4. A similar checking step is performed on the wheel FL and RR lines. If either the FR or RL line is a control object, step 202 determines which of the lines is a control object. If the FR wheel is the control object, step 203 estimates the amount of fluid remaining in the reservoir 23. If the RL wheel is the control object, step 204 performs substantially the same operation as in step 203. Then the operation proceeds to step 205. The operations performed in steps 203 and 204 are substantially the same and will be described later with reference to FIG. 6.

If step 205 determines that calculations on the FR or RL line are completed and step 206 determines that the wheel FR or RL line is brought under the pressure reduction mode, the operation proceeds to step 207 to add to the amount Rc of fluid remaining in the reservoir 23 the total value Rfr, Rfl of amounts (+) Rfr, (+) Rfl and (−) RFR, (−) Rfl of fluid flowing into the reservoir 23 through the wheel FR or RL line, or to subtract the total value Rfr, Rfl from the amount Rc, thus updating the fluid amount RC in the reservoir 23. Step 208 clears a take-in control flag Fc, and the operation proceeds to step 212. Conversely, if step 206 determines that neither the FR line nor the RL line is under the pressure reduction mode, step 209 updates the fluid amount Rc in the reservoir 23 as in step 207, and step 210 determines whether the calculated reservoir 23 fluid amount Rc is equal to or less than zero. If step 210 determines that the fluid amount Rc is equal to or less than zero, the operation proceeds to step 211 to set the take-in control flag Fc and then proceeds to step 212. If the reservoir 23 fluid amount Rc is greater than zero, the operation proceeds to step 208 to clear the flag Fc and then proceeds to step 212. If step 212 determines that the control flag Fc has been set, step 213 sets output of a take-in control signal so that the brake fluid will be supplied from the master cylinder 2a to the wheel cylinder. If step 212 determines that the take-in control flag Fc has not been set, the operation returns to the main routine illustrated in FIG. 4.

Figure 6:
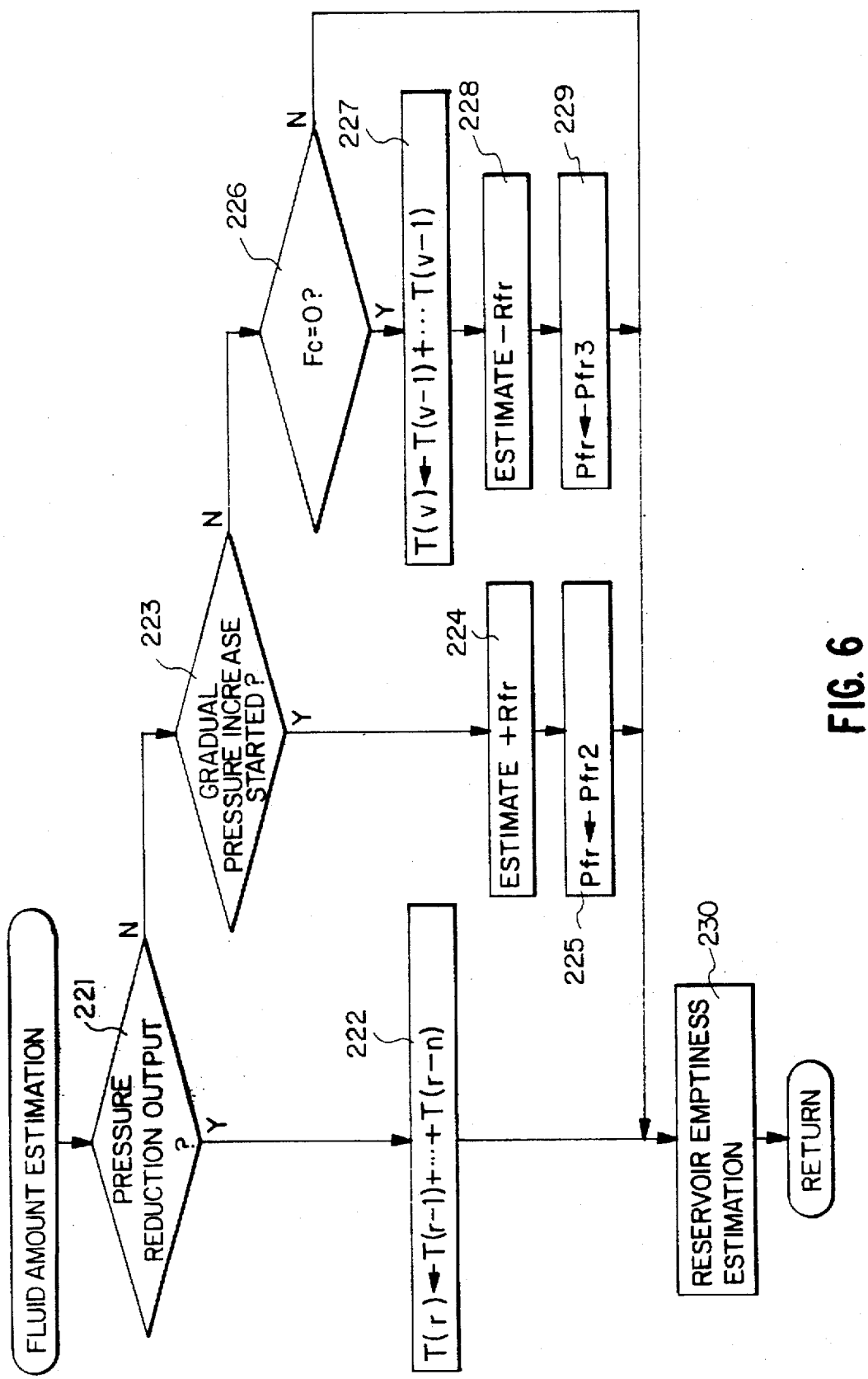
FIG. 6 is a flowchart illustrating an operation of fluid amount estimation according to the embodiment.

The flowchart of FIG. 6 illustrates the reservoir fluid amount estimation performed in steps 203, 204 in conjunction with the wheel FR. The similar operation is performed in conjunction with the wheel RL. Step 221 determines whether the pressure reduction signal is being outputted with respect to the control of the wheel FR line. If the wheel FR line is under the pressure reduction control mode, step 222 updates the elapsed time T(r) measured from the start of the pressure reduction and the operation proceeds to step 230. If step 221 determines that the pressure reduction signal is not being outputted, step 223 determines whether the gradual pressure increase control mode has been started. If it has been started, the operation proceeds to step 224 to estimate the amount (+)Rfr of brake fluid flowing from the wheel cylinder into the reservoir 23 (the flow from the wheel RL line is indicated by (+)Rfl) at the elapse of pressure reduction time T(r). Then, step 225 determines a fluid pressure Pfr2 at the elapse of the latest pressure reduction Tr updated in step 222 on the basis of the pressure reduction characteristics occurring if the wheel cylinder pressure at the start of the control is determined as Pfr1 in step 108 of the flowchart in FIG. 4. The present pressure Pfr is thus updated to the pressure Pfr2 and the operation proceeds to step 230. Conversely, if step 233 determines that the gradual pressure increase control has not been started, step 226 determines whether the take-in control flag Fc has been set. If the flag Fc has not been set, the operation proceeds to step 230. If the take-in control flag Fc has been set, the operation proceeds to step 227.

Step 227 determines the elapsed time T(v) from the start of the gradual pressure increase control. Step 228 estimates the amount (−)Rfr of brake fluid flowing out of the reservoir 23 into the wheel FR line (the flow-out into the wheel RL line is indicated by (−)Rfl) corresponding to the gradual pressure increase time T(v). Then, step 229 estimates a fluid pressure Pfr3 at the elapse of the latest gradual pressure increase time T(v)ga updated in step 227, on the basis of the characteristics occurring if the wheel cylinder pressure is determined as Pfr2 in step 225. The present pressure Pfr is thus updated to the pressure Pfr3 and the operation proceeds to step 230. Step 230 performs estimation of the reservoir fluid as described later. Then, the operation returns to step 205 in FIG. 5.

The reservoir emptiness estimation will be described with reference to the flowcharts in FIGS. 7 and 8. The flowcharts illustrate methods for determining whether the reservoir has become empty on the basis of changes in the load on the electric motor that drives the pumps 21, 22.

Figure 7:
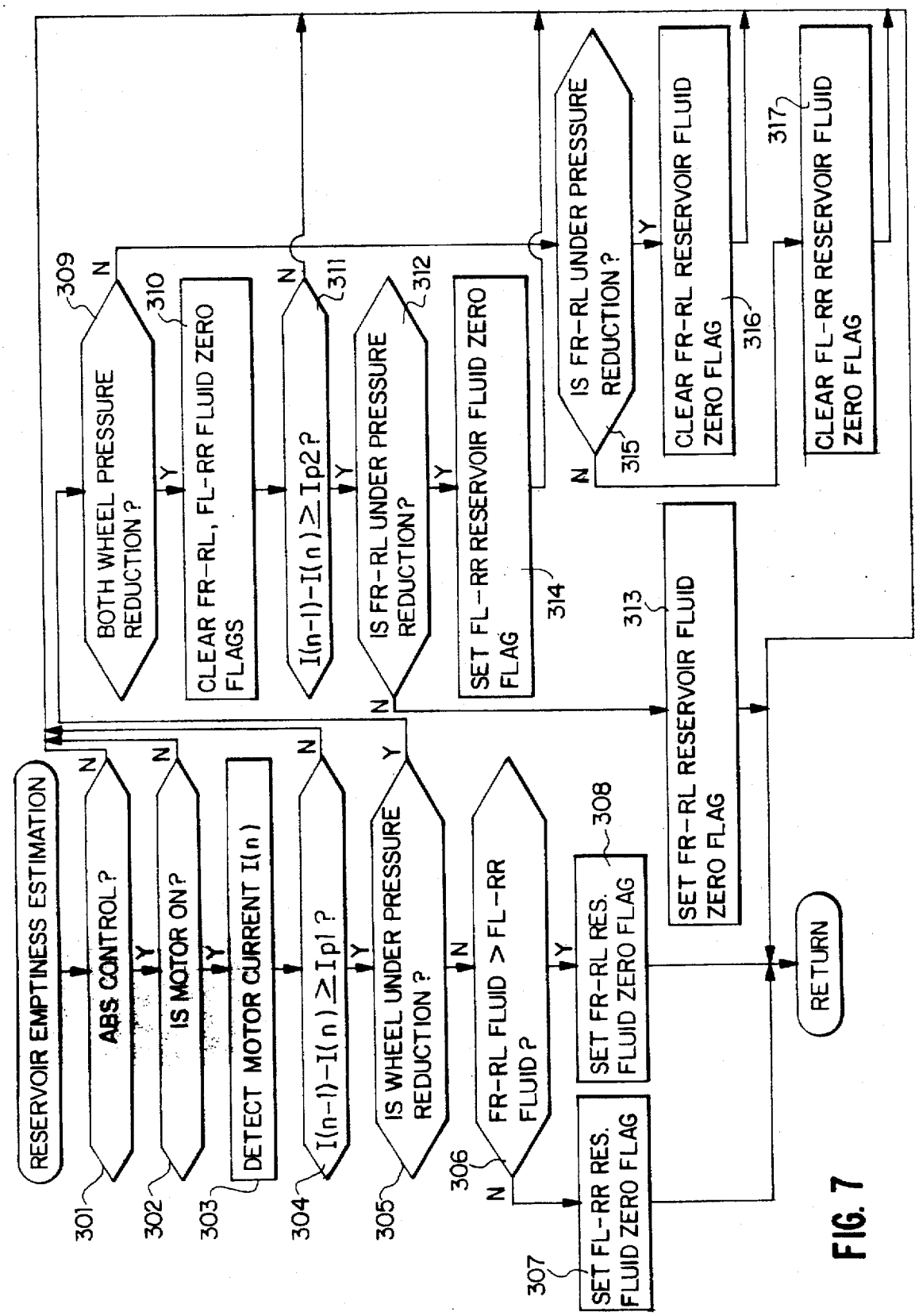
FIG. 7 is a flowchart illustrating an operation performed in the step of estimating the amount of fluid remaining in the reservoir shown in FIG. 6.
Figure 8:
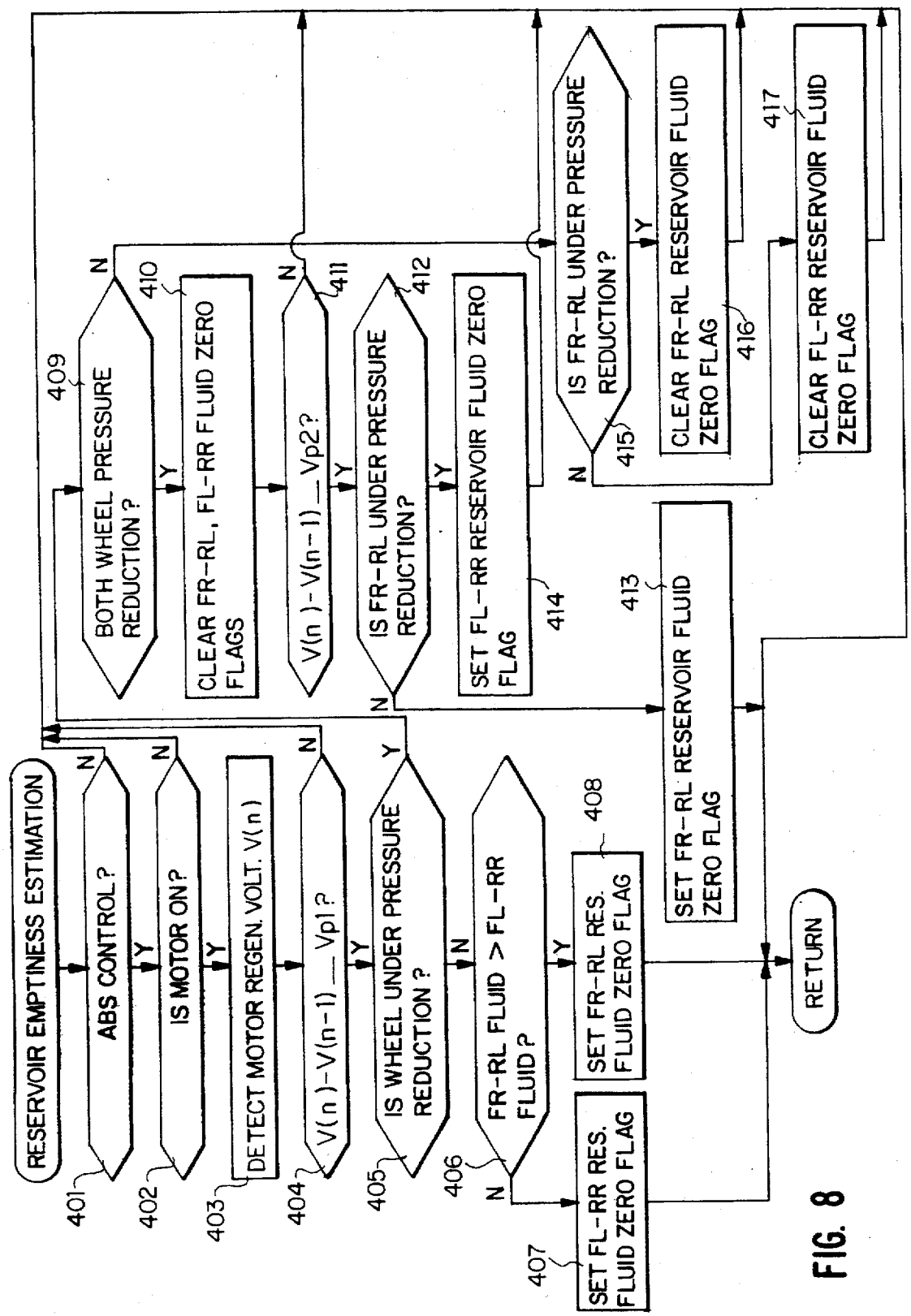
FIG. 8 is a flowchart illustrating another operation performed in the step of estimating the amount of fluid remaining in the reservoir shown in FIG. 6.

First, the method for detecting emptiness of the reservoir on the basis of a change in the motor current with reference to the flowchart in FIG. 7. Step 301 determines whether the anti-skid control (ABS control) is being performed. If the anti-skid control is being performed, the operation proceeds to step 302. If the anti-skid control is not being performed, the operation proceeds to step 205 shown in FIG. 5. Step 302 determines whether the electric motor is in operation. If the electric motor is in operation, the operation proceeds to step 303. If the electric motor is not in operation, the operation proceeds to step 205. Step 303 detects the current I(n) through the electric motor in operation. Step 304 compares the presently detected current value I(n) and the previously detected current value I(n−1), and determines whether the difference between the two values equals or exceeds a predetermined value Ip1. If the difference equals or exceeds the value Ip1, the operation proceeds to step 305. If the difference is less than the value Ip1, the operation proceeds to step 205. Step 305 determines whether either one of the wheels of the circuits (FR-RL circuit or FL-RR circuit) is under the pressure reduction mode. If either of the wheels of the circuit (FR-RL circuit or RL-RR circuit) is under the pressure reduction mode, the operation proceeds to step 309. If neither of them is under the pressure reduction mode, the operation proceeds to step 306. Step 306 compares the reservoir fluid amount in the FR-RL circuit and the reservoir fluid amount in the FL-RR circuit. If the reservoir fluid amount in the FR-RL circuit is larger than the reservoir fluid amount in the FL-RR circuit, step 308 sets a reservoir fluid zero flag for the FR-RL circuit. If the reservoir fluid amount in the FR-RL circuit is smaller than the reservoir fluid amount in the FL-RR circuit, step 307 sets a reservoir fluid zero flag for the FL-RR circuit. Then, the operation returns to step 205 shown in FIG. 5. In step 309, which is performed following the affirmative determination in step 305, it is determined whether the control is being performed in the both-wheel pressure reduction mode. If the control is being performed in the both-wheel pressure reduction mode, the operation proceeds to step 310. If step 309 makes a negative determination, step 315 determines whether the FR-RL circuit is under the pressure reduction mode. If the FR-RL circuit is under the pressure reduction mode, step 316 clears the reservoir fluid zero flag for the FR-RL circuit. If the FR-RL circuit is not under the pressure reduction mode, step 317 clears the reservoir fluid zero flag for the FL-RR circuit. Then, the operation proceeds to step 205 in FIG. 5. Following the affirmative determination in step 309, step 310 clears both the reservoir fluid zero flags for the FR-RL and FL-RR circuits. If step 311 determines that the difference between the previously detected current value I(n−1) and the currently detected current value I(n) equals or exceeds a predetermined value Ip2, the operation proceeds to step 312. If the difference is less than the value Ip2, the operation proceeds to step 205. Step 312 determines whether the FR-RL circuit is under the pressure reduction mode. If the FR-RL circuit is under the pressure reduction mode, step 314 sets the reservoir fluid zero flag for the FL-RR circuit. If the FR-RL circuit is not under the pressure reduction mode, step 313 sets the reservoir fluid zero flag for the FR-RL circuit. Then, the operation proceeds to step 205 in FIG. 5.

Next, the method of detecting emptiness of the reservoir on the basis of a regenerative voltage occurring when the duty voltage for driving the electric motor is off will be described with reference to FIG. 8.

Step 401 determines whether the anti-skid control (ABS control) is being performed. If the anti-skid control (ABS control) is being performed, the operation proceeds to step 402. If not, the operation proceeds to step 205 in FIG. 5. In the case where the electric motor is driven in a short cycle, step 402 determines whether the electric motor is in operation. If the electric motor is in operation, the operation proceeds to step 403. If the electric motor is not in operation, the operation proceeds to step 205 in FIG. 5. Step 403 detects a voltage (regenerative voltage) V(n) occurring when the duty voltage for driving the electric motor is off. Step 404 compares the presently detected voltage value V(n) and the previously detected voltage value V(n−1) and determines whether the difference between the two values equals or exceeds a predetermined value Vp1. If the difference equals or exceeds the value Vp1, the operation proceeds to step 405. If it is less than the value Vp1, the operation proceeds to step 205. Step 405 determines whether either one of the wheels is under the pressure reduction mode. If either one of the wheels is under the pressure reduction mode, the operation proceeds to step 409. If neither of the wheels is under the pressure reduction mode, the operation proceeds to step 406. Step 406 compares the reservoir fluid amount in the FR-RL circuit and the reservoir fluid amount in the FL-RR circuit. If the reservoir fluid amount in the FR-RL circuit is larger than the reservoir fluid amount in the FL-RR circuit, step 408 sets a reservoir fluid zero flag for the FR-RL circuit. If the reservoir fluid amount in the FR-RL circuit is smaller than the reservoir fluid amount in the FL-RR circuit, step 407 sets a reservoir fluid zero flag for the FL-RR circuit. Then, the operation returns to step 205 shown in FIG. 5. In step 409, which is performed following the affirmative determination in step 405, it is determined whether the control is being performed in the both-wheel pressure reduction mode. If the control is being performed in the both-wheel pressure reduction mode, the operation proceeds to step 410. If step 409 makes a negative determination, step 415 determines whether the FR-RL circuit is under the pressure reduction mode. If the FR-RL circuit is under the pressure reduction mode, step 416 clears the reservoir fluid zero flag for the FR-RL circuit. If the FR-RL circuit is not under the pressure reduction mode, step 417 clears the reservoir fluid zero flag for the FL-RR circuit. Then the operation proceeds to step 205 in FIG. 5. Following the affirmative determination in step 409, step 410 clears both the reservoir fluid zero flags for the FR-RL and FL-RR circuits. If step 411 determines that the difference between the currently detected voltage value V(n) and the previously detected voltage value V(n−1) equals or exceeds a predetermined value Vp2, the operation proceeds to step 412. If the difference is less than the value Vp2, the operation proceeds to step 205. Step 412 determines whether the FR-RL circuit is under the pressure reduction mode. If the FR-RL circuit is under the pressure reduction mode, step 414 sets the reservoir fluid zero flag for the FL-RR circuit. If the FR-RL circuit is not under the pressure reduction mode, step 413 sets the reservoir fluid zero flag for the FR-RL circuit. Then the operation proceeds to step 205 in FIG. 5.

Figure 9:
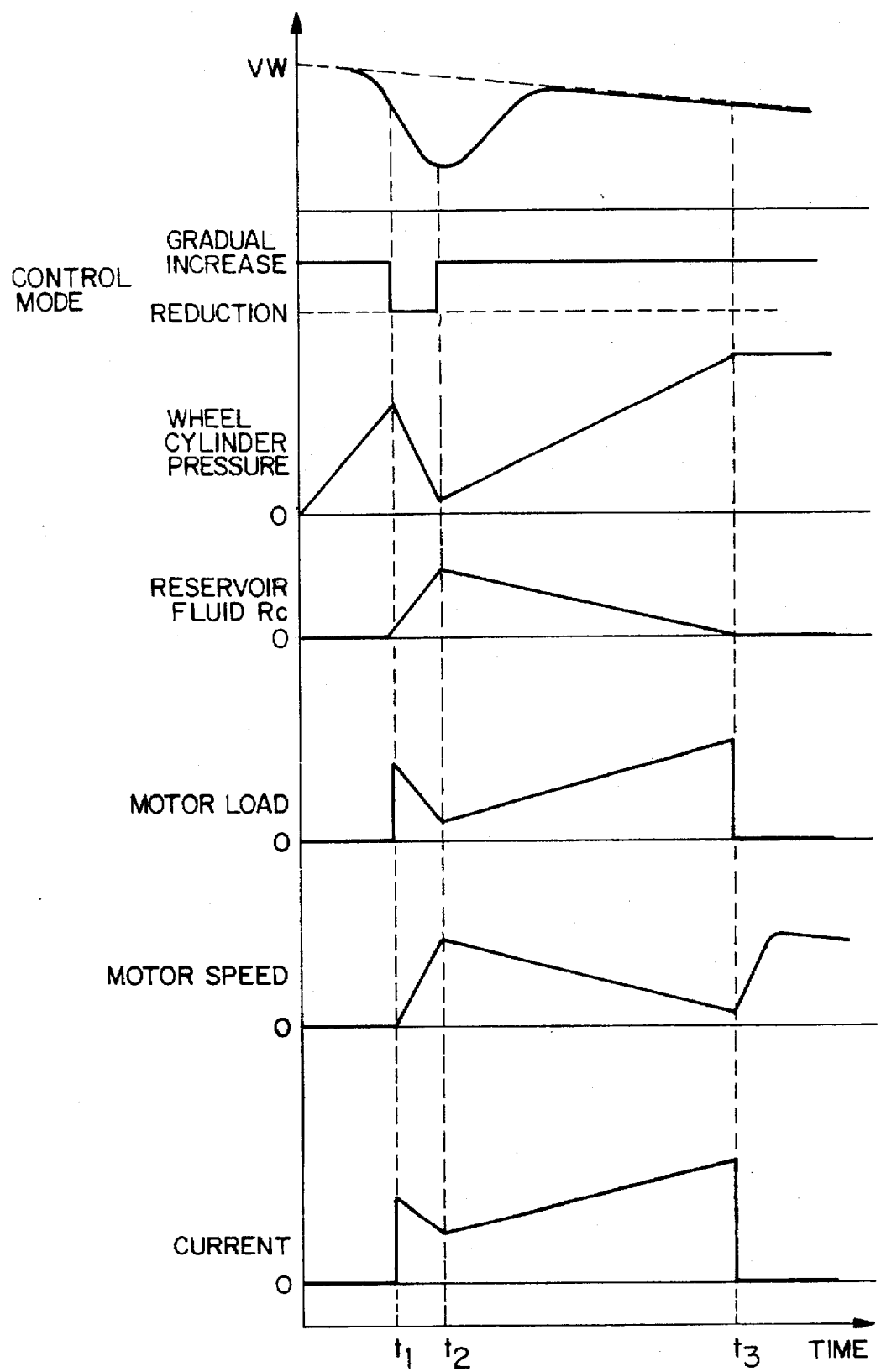
FIG. 9 is a graph indicating various operational conditions according to another embodiment of the invention.

The operation of the above described embodiment will be described with reference to FIG. 9. To simplify the description, it is assumed that the pressure reduction and the gradual pressure increase of the FR wheel, and the pressure reduction and the gradual pressure increase of the FL wheel, are synchronized. When the brake system is operated so that the anti-skid control is started at time t1 (the wheel cylinder at this time is expressed as P1) and the control enters the pressure reduction mode, the wheel cylinder pressure will be reduced and the electric motor load will decrease. The brake fluid will simultaneously flow into the reservoir so that the motor speed and current will increase. When the mode shifts from the pressure reduction to the gradual pressure increase at time t2, the wheel cylinder pressure stops decreasing and starts increasing. With increases of the wheel cylinder pressure, the motor load increases so that the motor speed decreases and the current increases. Then, at time t3, when all the brake fluid has been pumped out of the reservoir, the wheel cylinder pressure stops increasing. Since no more brake fluid is pumped out, the motor load sharply decreases. In response to the sharp decrease of the motor load, the motor speed increases and the motor current sharply decreases. In short, when the pressure reduction has been started and when the reservoir has become empty, the motor speed sharply increases and the motor current sharply decreases. Therefore, by detecting a sharp increase of the electric motor speed or a sharp decrease of the current, it can be determined that the reservoir has become empty.

Figure 10:
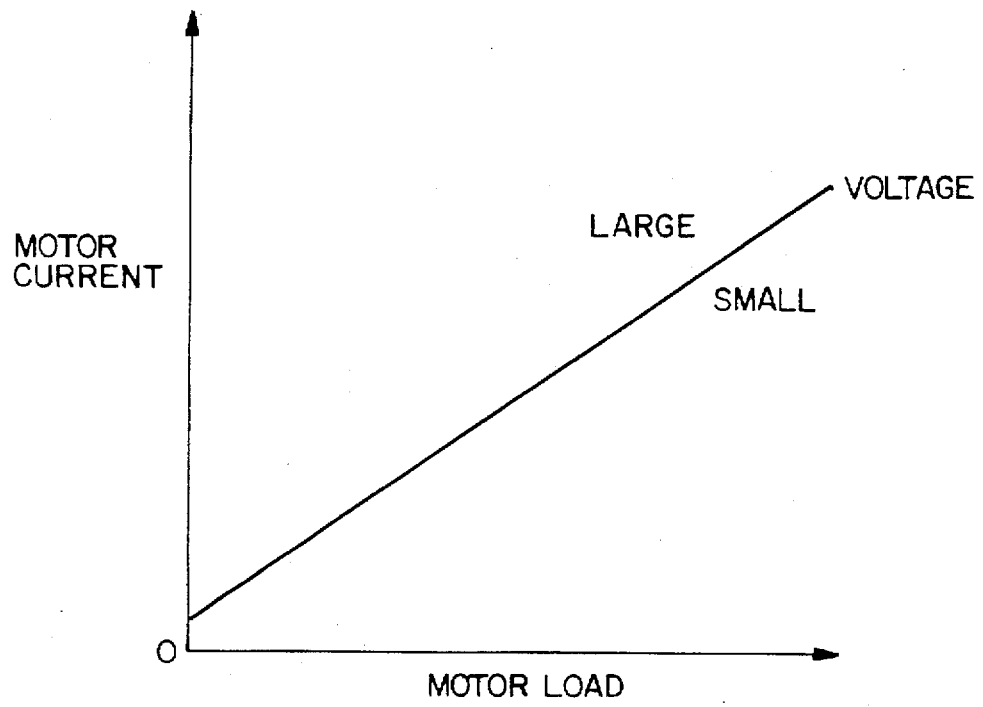
FIG. 10 is a graph indicating the relation between the motor load and the motor current.
Figure 11:
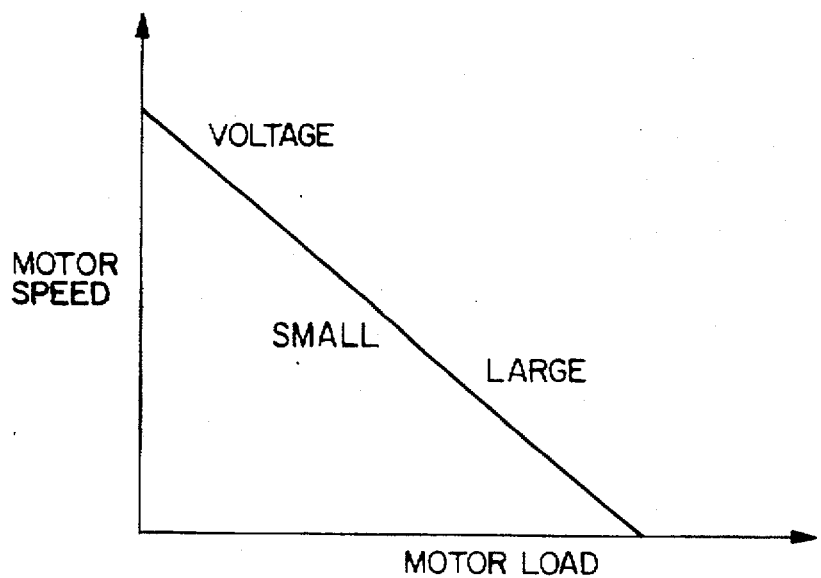
FIG. 11 is a graph indicating the relation between the motor load and the motor speed.

FIGS. 10 and 11 indicate the relation between the load and the speed of the electric motor and the relation between the motor load and the motor current. As described above, when the reservoir becomes empty, the load on the electric motor sharply decreases so that the required torque output from the electric motor will become less. With decreases of the motor load, the motor current decreases and the regenerative voltage, that is, voltage occurring when the duty voltage for driving the electric motor is off, increases, as indicated in the graphs of FIGS. 10 and 11. Based on detection of such changes, the emptiness of the reservoir can be detected according to the different embodiments. In a system comprising two circuits, that is, the FR-RL and FL-RR circuits, a combination of the method of estimating emptiness of a reservoir based on a sharp decrease of the motor current or a sharp increase of the regenerative voltage, that is, voltage occurring when the duty voltage for driving the motor is off, may be utilized. The method which includes steps 221 through 229 shown in FIG. 6 makes it possible to determine that one of the reservoirs that stores less brake fluid is empty. The embodiment thereby improves the precision in estimating the amounts of fluid remaining in the reservoirs and enables determination of which of the reservoirs has become empty.

According to the invention, the wheel cylinder pressure is reduced by the reservoirs storing brake fluid and the brake fluid is returned from the reservoirs to the wheel cylinders by the fluid pressure pumps. The apparatus of the invention enables determination of emptiness of either one of the reservoirs by detecting a sharp decrease of the electric motor current during the gradual pressure increase or a sharp increase of the regenerative voltage, that is, the voltage occurring when the duty voltage for driving the motor is off, during the gradual pressure increase. Thus, the apparatus estimates the brake fluid amount using inexpensive means, without requiring an expensive flow sensor.

In addition, if one of the reservoirs becomes empty, the fluid pressure control apparatus is operated to connect the fluid pressure generating apparatus with the corresponding wheel cylinders to supply the brake fluid thereto, as described above. Thus, the invention achieves sufficient deceleration to provide a predetermined braking force without a failure even if the gradual pressure increase has been performed.

While the present invention has been particularly shown and described with reference to preferred embodiments thereof, it will be understood by those in the art that the invention is not limited to the disclosed embodiments. To the contrary, the invention is intended to cover various modifications and equivalent arrangements included within the spirit and scope of the appended claims.

What is claimed is:

1. An anti-skid control apparatus comprising:
    a wheel brake cylinder for applying braking force to a wheel of a vehicle;
    fluid pressure generating apparatus for supplying brake fluid to the wheel brake cylinder to apply thereto fluid pressure;
    fluid pressure control apparatus provided between the fluid pressure generating apparatus and the wheel brake cylinder for controlling fluid pressure in the wheel brake cylinder;
    a reservoir communicated with said fluid pressure control apparatus, said reservoir having a capacity for storing a predetermined amount of brake fluid, and said reservoir storing the brake fluid in said wheel brake cylinder through said fluid pressure control apparatus to decrease the pressure in said wheel brake cylinder;
    a return passage for communicating said reservoir with said wheel brake cylinder;
    a pressure pump disposed in said return passage, said pressure pump having an inlet port communicated with said reservoir and an outlet port communicated with said wheel brake cylinder for discharging a pressurized brake fluid thereto, said pressure control apparatus blocking the communication between said fluid pressure generating apparatus and said wheel brake cylinder whereby said pressure pump discharges the brake fluid stored in said reservoir into said return passage to gradually increase the pressure in said wheel brake cylinder;
    an electric motor for driving said pressure pump;
    motor load detecting means for detecting motor load on said electric motor during driving of said pressure pump, said motor load being at a minimum level upon idle operation of said pressure pump; and
    reservoir emptiness estimating means for determining that no brake fluid remains in the reservoir in response to a sharp decrease in the motor load detected by the motor load detecting means while gradually increasing the pressure in the wheel cylinder.

2. An anti-skid control apparatus according to claim 1, wherein the motor load detecting means includes means for detecting current through the motor.

3. An anti-skid control apparatus according to claim 1, wherein the motor load detecting means includes means for detecting regenerative voltage that occurs when duty voltage for driving the motor is off.

4. An anti-skid control apparatus according to claim 1, further comprising pressure increase allowing means for driving the fluid pressure control apparatus to allow for fluid communication of the fluid pressure generating apparatus with the wheel cylinder when the reservoir emptiness estimating means estimates that no brake fluid is stored in the reservoir.

* * * * *